No. 774,042. PATENTED NOV. 1, 1904.
A. N. COOPER.
VEHICLE AXLE.
APPLICATION FILED APR. 6, 1904.
NO MODEL.
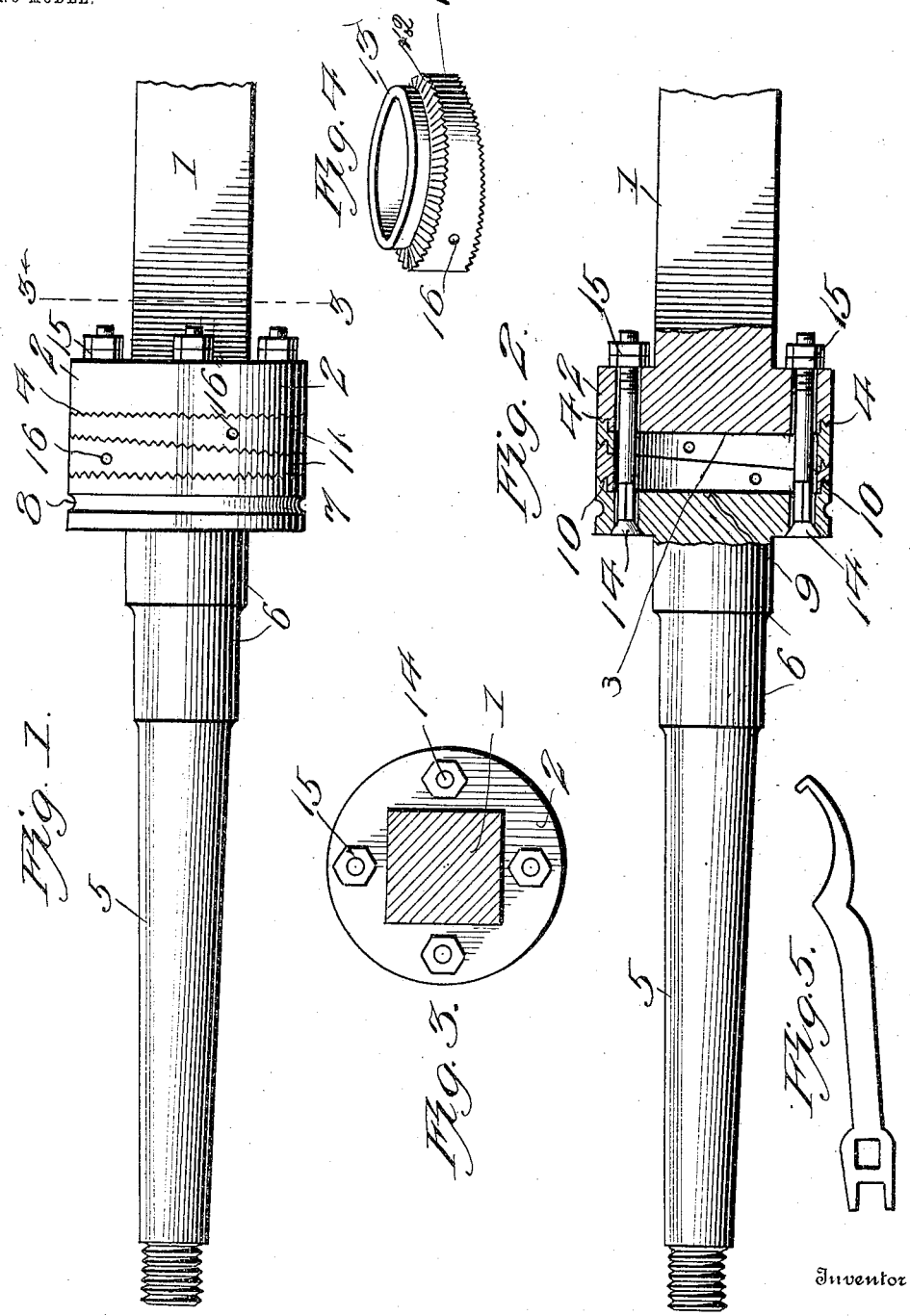
Witnesses
Inventor
Albert N. Cooper,
By Victor J. Evans
Attorney No. 774,042.

Patented November 1, 1904.

UNITED STATES PATENT OFFICE.

ALBERT N. COOPER, OF DARBY, MONTANA.

VEHICLE-AXLE.

SPECIFICATION forming part of Letters Patent No. 774,042, dated November 1, 1904.

Application filed April 6, 1904. Serial No. 201,887. (No model.)

*To all whom it may concern:*

Be it known that I, ALBERT N. COOPER, a citizen of the United States, residing at Darby, in the county of Ravalli and State of Montana, have invented new and useful Improvements in Vehicle-Axles, of which the following is a specification.

My invention relates to new and useful improvements in vehicle-axles; and its object is to provide a device of this character having a detachable spindle which can be removed and replaced when desired and which can be arranged at a desired angle in relation to the body of the axle.

The invention consists of a spindle having a head at its inner end which is spaced from a head formed upon the adjoining end of the axle-body by means of rings which are beveled from one side to the other and which are adapted to be adjusted to any desired angle to each other to hold the spindle at the proper angle.

The invention also consists of securing means for holding the two heads and the rings securely together.

The invention also consists in the further novel construction and combination of parts hereinafter more fully described and claimed, and illustrated in the accompanying drawings, showing the preferred form of my invention, and in which—

Figure 1 is a side elevation of a portion of an axle and showing a spindle secured thereto. Fig. 2 is a similar view showing the heads and rings in section. Fig. 3 is a section on line 3 3, Fig. 1. Fig. 4 is a perspective view of one of the rings detached, and Fig. 5 is a detail view of a tool adapted to be used for adjusting the rings.

Referring to the figures by numerals of reference, 1 is an axle having a cylindrical head 2, from which extends a cylindrical projection 3, which is concentric with the head and is inclosed by a series of teeth 4.

5 is a tapered axle-spindle, the inner end of which is stepped, as shown at 6, and is provided with a head 7 cylindrical in form and having an annular sand-groove 8 therein. This head is provided with a circular recess 9 in one face, which is inclosed by a series of teeth 10. Interposed between the heads 2 and 7 are similar rings 11, which taper from one side to the other and which when oppositely arranged and placed one upon the other form a cylinder having parallel ends. Each of these rings 11 has a toothed end 12, which incloses an extension 13, which is equal in diameter to the recess 9 and to the internal diameter of the ring 11. Teeth are also formed upon the end of the ring 11, which is opposite the flange 12. As hereinbefore stated, the two rings are tapered from one side to the other. These rings are adapted to interlock by placing the extensions 13 into the toothed ends of the rings 11. The toothed surfaces of the two rings will thus engage each other and will also engage the toothed faces of the heads 2 and 7. Bolts 14 extend through the heads 2 and 7 and through the rings 11 and are adapted to bind said heads and rings together. They are held in proper position by means of nuts 15. It will be understood that by rotating one of the rings 11 the spindle 5 can be adjusted to a desired angle in relation to the axle 1. In other words, by placing the narrowest portion of one ring upon the widest portion of the other ring the spindle 5 and the axle 1 will aline, whereas by adjusting these rings to any other positions in relation to each other the spindle and axle will be held at a greater or less angle to the axle.

By providing a device such as herein described broken spindles can be replaced at slight cost, and should a spindle become bent the same can be easily adjusted, so as to hold the wheel in proper position. The rings 11 can be adjusted in any suitable manner, preferably by loosening the bolts 14 and placing a tool, such as shown in Fig. 5, into engagement with apertures 16, formed within the ring. Said rings can then be rotated and after having been moved to desired positions they can be clamped by the bolts 14.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with an axle having a head at one end thereof; of a spindle spaced from the axle and having a head at one end, non-resilient adjusting devices interposed between the heads and adapted to hold them apart, and means for clamping the heads and adjusting devices together.

2. The combination with an axle having a head at one end thereof; of a spindle having a head at one end thereof, tapered rings adjustably mounted between the heads, and means for clamping the heads and rings together.

3. The combination with an axle having a head at one end thereof; of a spindle having a head at one end, similar tapered rings interposed between the heads, and means for clamping the heads and rings together.

4. The combination with an axle having a head at one end thereof, and an extension upon the head; of a spindle having a recessed head at one end, similar tapered rings interposed between the heads and having extensions thereon whereby the heads and rings are adapted to interlock, and means for binding the heads and rings together.

5. The combination with an axle having a toothed head at one end thereof; of a spindle having a toothed head at one end, non-resilient toothed adjusting devices interposed between and adapted to engage the heads, and means for binding the heads and adjusting devices together.

6. The combination with an axle having a toothed head at one end thereof; of a spindle having a toothed head thereon, similar beveled toothed rings interposed between the heads and adapted to engage the same, and means for binding the heads and rings together.

7. The combination with an axle having a toothed head thereon, and an extension on the head; of a spindle having a recessed toothed head, similar tapered adjusting devices interposed between the heads and adapted to engage the same, extensions upon said devices, whereby the adjusting devices and heads are adapted to interlock, and means for clamping the heads and adjusting devices together.

8. The combination with an axle having a toothed head thereon, and a extension on the head; of a spindle having a recessed toothed head, similar tapered toothed rings interposed between the head and adapted to engage the same, extensions upon the rings whereby the rings and heads are adapted to interlock, and means for clamping the rings and heads together.

In testimony whereof I affix my signature in presence of two witnesses.

ALBERT N. COOPER.

Witnesses:
   HERSHELL D. VANCE,
   GEO. MILES.